United States Patent
Chen et al.

(10) Patent No.: US 7,535,950 B2
(45) Date of Patent: May 19, 2009

(54) BLIND SELECTED MAPPING TECHNIQUES FOR CREST FACTOR REDUCTION OF FORWARD LINK CDMA SIGNALS

(75) Inventors: Ning Chen, Atlanta, GA (US); Guotong Zhou, Atlanta, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 633 days.

(21) Appl. No.: 11/301,381

(22) Filed: Dec. 12, 2005

(65) Prior Publication Data

US 2006/0215732 A1    Sep. 28, 2006

Related U.S. Application Data

(60) Provisional application No. 60/636,174, filed on Dec. 15, 2004.

(51) Int. Cl.
*H04B 1/69*    (2006.01)
*H04B 7/216*   (2006.01)

(52) U.S. Cl. ........................................ 375/141; 370/342

(58) Field of Classification Search ................. 375/141, 375/130, 219, 144, 149, 340; 370/335, 342, 370/208, 210; 455/450, 446
See application file for complete search history.

(56) References Cited

U.S. PATENT DOCUMENTS

| | | | |
|---|---|---|---|
| 2004/0131032 A1* | 7/2004 | Sendonaris et al. | 370/335 |
| 2004/0141458 A1* | 7/2004 | Park et al. | 370/208 |
| 2004/0160893 A1* | 8/2004 | Park et al. | 370/206 |
| 2005/0249110 A1* | 11/2005 | Huo et al. | 370/208 |

* cited by examiner

*Primary Examiner*—Khai Tran
(74) *Attorney, Agent, or Firm*—Kenneth W. Float

(57) ABSTRACT

Disclosed are apparatus that implement blind selected mapping techniques that provide for crest factor reduction of forward link CDMA signals. Communication signals are processed using a mathematical algorithm that selectively maps a summed communication signal in a frame to another summed communication signal which has a smaller peak-to-average power ratio. The reduced dynamic range communication signal is amplified and transmitted to a receiver. At the receiver, the reduced power communication signal is processed using a mathematical algorithm that detects the selected mapping index used in the transmitter and converts the received signals into the original communication signals.

28 Claims, 6 Drawing Sheets

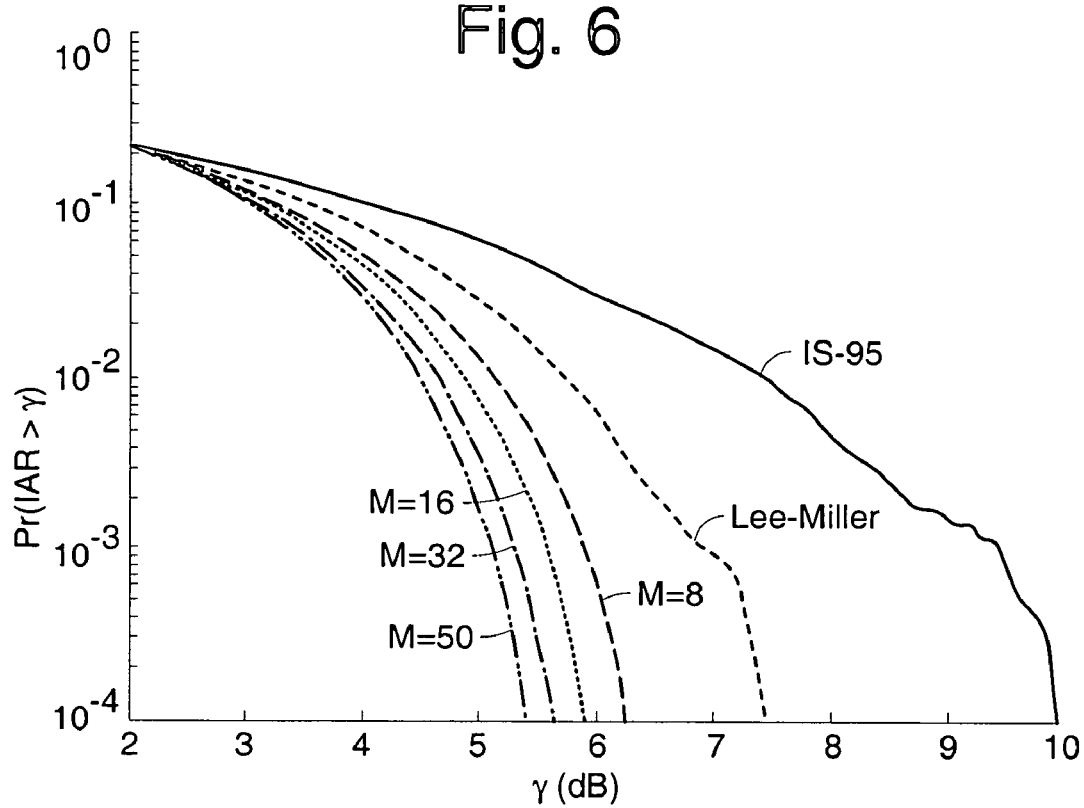
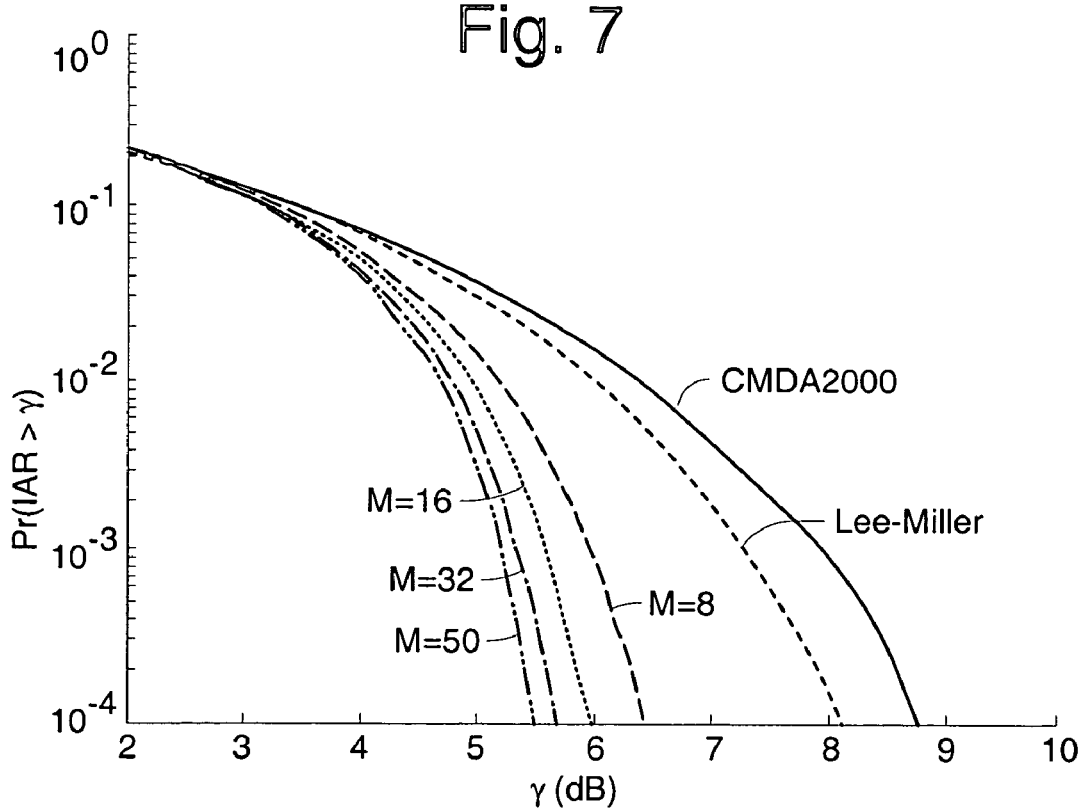

BLIND SELECTED MAPPING TECHNIQUES FOR CREST FACTOR REDUCTION OF FORWARD LINK CDMA SIGNALS

This application claims the benefit of U.S. Provisional Application No. 60/636,174, filed Dec. 15, 2004.

STATEMENT REGARDING FEDERALLY SPONSORED RESEARCH OR DEVELOPMENT

This invention was made with Government Support under Agreement No. CCR-0218778 awarded by the National Science Foundation. The U.S. Government may have a paid-up license in this invention and the right in limited circumstances to require the patent owner to license to others on reasonable terms as provided for by the terms of the Agreement.

BACKGROUND

The present invention relates to RF transmission systems and methods, and more particularly, to the peak-to-average power ratio reduction of forward link code division multiple access (CDMA) signals.

In the forward link of code division multiple access (CDMA), CDMA2000, and Wideband CDMA (WCDMA) communication systems, the signal envelope exhibits large variations due to the superposition of different channels as well as the baseband filtering. Crest factor, or peak-to-average power ratio (PAR), is often used to characterize the dynamic range of a signal. The crest factor is the square root of the peak-to-average power ratio, so they have the same value in dB. These two terms are used interchangeably in the literature and herein.

Handling very large crest factors is a challenging problem for an RF portion of a transmitter 11. A large crest factor means that a power amplifier (PA) must be oversized to handle the peak power for a given average power, necessitating higher equipment cost. Moreover, it can be shown that there is an inverse relationship between the efficiency of the PA and the crest factor of the input signal. Consequently, transmitting high PAR signals requires high operating costs. A high PAR also places stringent requirements on the linearity of the power amplifier.

Many crest factor reduction (CFR) techniques have been proposed in the literature. Most published results deal with orthogonal frequency division multiplexing (OFDM) signals; the relevant CFR techniques include clipping, windowing, coding, tone reservation, tone injection, partial transmit sequence, selected mapping, companding approaches, etc. These techniques are discussed in J. Tellado, *Multicarrier Modulation with Low PAR: Applications to DSL and Wireless*, Kluwer Academic Publishers, 2000 and references cited therein. These techniques entail various performance, computational cost, and information rate tradeoffs.

In comparison, the body of literature on CFR for CDMA signals is rather small. As discussed by V. K. N. Lau, "On the analysis of peak-to-average ratio (PAR) for IS95 and CDMA 2000," *IEEE Trans. Veh. Technol.*, vol. 49, no. 6, pp. 2174-2188, November 2000, V. K. N. Lau, "Average of peak-to-average ratio (PAR) of IS95 and CDMA2000 systems— single carrier," *IEEE Commun. Lett.*, vol. 5, no. 4, pp. 160-162, April 2001, and A. G. Shanbhag and E. G. Tiedemann, "Peak-to-average reduction via optimal Walsh code allocation in third generation CDMA systems," *IEEE 6th International Symposium on Spread Spectrum Techniques and Applications*, vol. 2, pp. 560-564, September 2000, a Walsh code selection algorithm was proposed to reduce the PAR by assuming that only part of the channels are active at any given time. Based on the same assumption, a PAR reduction algorithm was proposed by adding a signal that is orthogonal to all the active channel codes by O. Väänänen, J. Vankka, T. Viero, and K. Halonen, "Reducing the crest factor of a CDMA downlink signal by adding unused channelization codes," *IEEE Commun. Lett.*, vol. 6, no. 10, pp. 443-445, October 2002. In a paper by J. S. Lee and L. E. Miller, "Analysis of peak-to-average power ratio for IS-95 and third generation CDMA forward link waveforms," *IEEE Trans. Veh. Technol.*, vol. 50, no. 4, pp. 1004-1013, July 2001, the authors proposed to reduce the PAR of the forward link CDMA signal by changing the signs of the Walsh codes in one branch of the quadrature modulation.

Partial transmit sequence (PTS) discussed by S. H. Muller and J. B. Hüber, "OFDM with reduced peak-to-average power ratio by optimum combination of partial transmit sequence," *Electron. Lett.*, vol. 33, no. 5, pp. 368-369, February 1997, and selected mapping (SLM) discussed by R. W. Bauml, R. F. H. Fischer, and J. B. Huber, "Reducing the peak-to-average power ratio of multicarrier modulation by selected mapping," *Electron. Lett.*, vol. 32, no. 22, pp. 2056-2057, October 1996, are effective PAR reduction algorithms for OFDM systems. As discussed by N. Ohkubo and T. Ohtsuki, "A peak to average power ratio reduction of multicarrier CDMA using selected mapping," in *Proc. IEEE 56th Vehicular Technology Conference, VTC 2002-Fall*, vol. 4, pp. 2086-2090, September 2002, S. Ruangsuthinarupap, K. M. Ahmed, W. A. C. Fernando, M. E. R. Khan, "PAPR reduction by combining selected mapping and selected spreading code in MC-CDMA systems," in *Proc. 9th International Symposium on Computers and Communications, ISCC* 2004, vol. 2, pp. 725-729, 2004, and Y. You, W. Jeon, J. Paik, H. Jung, "Low-complexity PAR reduction schemes using SLM and PFS approaches for OFDM-CDMA signals," *IEEE Trans. Consumer Electron.*, vol. 49, no. 2, pp. 284-289, May 2003, PTS and SLM were adopted for CFR of OFDM-CDMA systems. However, these techniques were applied only to the OFDM part of the system and not to the CDMA part of the system.

Although CFR for OFDM and CFR for CDMA can share some common ground, the techniques themselves are largely different because of the different signal formats that must be dealt with. Moreover, the PAR definitions are also different. OFDM is a block processing technique; therefore, the peak is well defined over a block. In OFDM, PAR is treated as a random variable; its complementary cumulative distribution function (CCDF) is often analyzed based on which the performance of a CFR algorithm is assessed. In CDMA however, the instantaneous-to-average power ratio (IAR) is of interest, as is discussed in the Lee et al. "Analysis of peak-to-average power ratio for IS-95 and third generation CDMA forward link waveforms" paper. The CCDF of the IAR is computed and the PAR is taken as the value $\gamma$ such that the CCDF $Pr(IAR>\gamma)=p$ for a small p as discussed by R. A. Attar, "On the peak-to-average ratio (PAR) of an IS-856 (cdma2000 1xEV) forward link," *Proc. IEEE MWCN*, 2001 and V. K. N. Lau in "On the analysis of peak-to-average ratio (PAR) for IS95 and CDMA 2000."

In view of the above, it would be desirable to have blind selected mapping techniques that provide crest factor reduction for forward link CDMA signals.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 3a and 3b illustrate PN offset planning for CDMA and BSPNM-CDMA systems, respectively;

FIG. 6 illustrates CFR performance of BSPNM for IS-95 with 3 overhead channels and 6 traffic channels as described in Table 1;

FIG. 7 illustrates CFR performance of BSPNM for CDMA2000 with 3 overhead channels and 6 traffic channels as described in Table 1.

DETAILED DESCRIPTION

Figure 8:
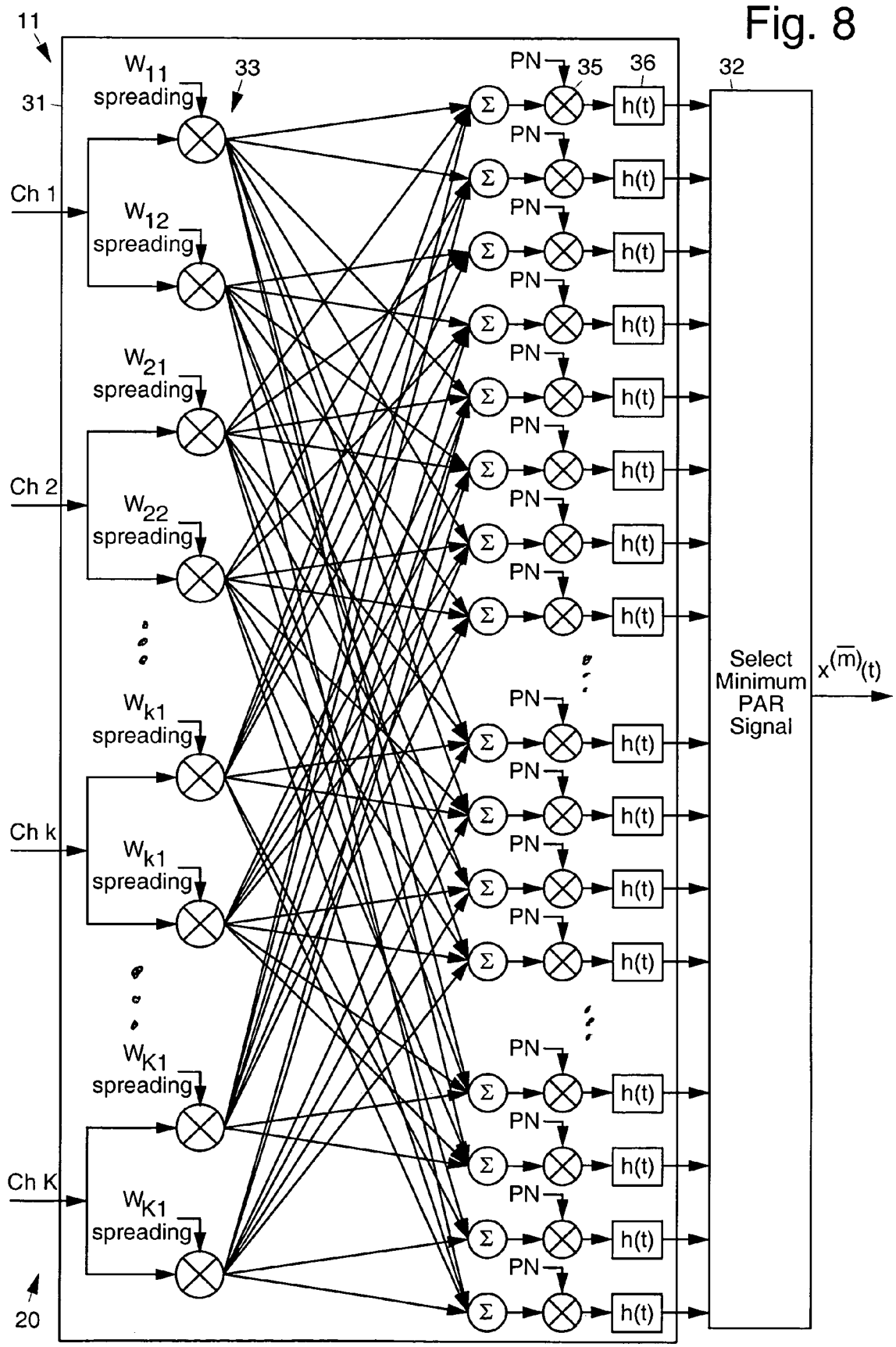
FIG. 8 illustrates an exemplary forward link CDMA transmitter using Walsh code selected mapping.

Disclosed herein are apparatus 20 that provide novel crest factor reduction (CFR) techniques for forward link code division multiple access (CDMA) communication systems 10. The approaches disclosed herein use CDMA as a model system 10, but extensions for use with WCDMA or CDMA2000 are straightforward. The apparatus 20 are particularly well suited for use in cellular telephone systems 10, and the like. Exemplary embodiments of the apparatus 20 comprise selected mapping (SLM) apparatus 20 that may employ phase selected mapping (FIG. 4) or Walsh code selected mapping (FIG. 8).

Figure 1:
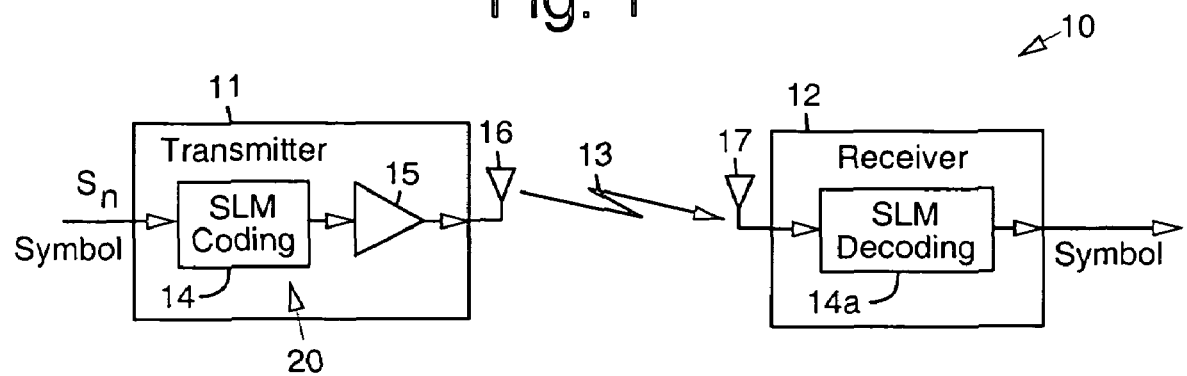
FIG. 1 illustrates an exemplary communication system employing selected mapping apparatus for providing crest factor reduction of forward link CDMA signals.

Referring to the drawing figures, FIG. 1 illustrates an exemplary communication system 10 employing selected mapping (SLM) apparatus 20 for providing crest factor reduction (i.e., dynamic range reduction) of forward link CDMA signals. The exemplary communication system 10 comprises a transmitter 11 that is coupled to a receiver 12 by way of a communication link 13.

The transmitter 11 includes the selected mapping apparatus 20 which comprises SLM coding circuitry 14. The SLM coding circuitry 14 is coupled to a power amplifier 15 whose output is coupled to an antenna 16. The SLM coding circuitry 14 processes communication signals (symbols) that are to be transmitted over the communication link 13 to receivers 12. The communication signals can have amplitude peaks that fluctuate dramatically from time to time, and generally require the use of a power amplifier 15 having a relatively large dynamic range.

The transmitter 11 transmits a signal that is the sum of multiple communication signals or symbols (such as multiple user signals processed at a particular cell tower location). The communication signals (symbols) that are processed for transmission each have a different Walsh code.

If the communication signals that are processed for transmission happen to have power peaks that occur at substantially the same time, these power peaks are summed to produce a large power peak (due to the superposition principle). Such large power peaks require a power amplifier 15 that has a large dynamic range. The selected mapping apparatus 20 is designed and implemented to reduce the dynamic range that is required for the power amplifier 15. This reduces the size and utility power requirements of the power amplifier 15, along with reducing cooling requirements for the power amplifier 15, resulting in significant cost reductions derived from use of the selected mapping apparatus 20.

The selected mapping apparatus 20 comprises firmware (software) that implements mathematical algorithms that prepare multiple representations of the original communication signal and select the one that has the lowest peak-to-average power ratio in a current frame to transmit. The firmware of the selected mapping apparatus 20 employs a predetermined lookup or assignment table, such as a phase table comprising multiple independent phase sequences to obtain the multiple representations. In a phase selected mapping embodiment, each phase sequence is applied to rotate the phases of the original multi-channel signal (phase mapping). The particular phase mapping that produces the lowest peak-to-average power ratio in a particular frame is selected and the resulting signal is transmitted.

The receiver 12 also includes an antenna 17 and SLM decoding circuitry 14a that includes a copy of the lookup or assignment table, such as the phase table used in the transmitter 11 along with correlation circuitry that performs correlation processing of received communication signals. The correlation circuitry and the phase table, for example, used in the receiver 12 comprise firmware (software) that implements a mathematical algorithm that converts the summed communication signal into the original communication signal.

The correlation circuitry is operative to correlate each of the mappings in the lookup or assignment table with the received communication signals to determine which of the mappings was used to create the summed signal at the transmitter 11. Thus, the process is "blind" in that the receiver 12 has no a priori knowledge of the exact mapping that was used in the transmitter 11, and the communication signal transmitted from the transmitter 11 to the receiver 12 does not include any information indicating the particular mapping that was used. The correlation processing performed in the receiver 12 is straightforward and simply involves correlation of the received communication signal with each of the mappings in the lookup or assignment (phase) table.

Details of the phase and Walsh code selected mapping performed in the transmitter 11 (mapping apparatus 20) are presented below.

From the V. K. N. Lau and J. S. Lee et al. papers, the complex envelope of the nth CDMA forward link symbol is defined as $$x(t) = \sum_{l=0}^{L-1} \sum_{k=1}^{K} A_k S_n[k] W_k[l] (P_I[l] + jP_Q[l]) h(t - lT_c), \quad (1)$$

$$(n-1)T_S \le t \le nT_S,$$

where $A_k$ is the amplification factor for the kth channel, $S_n[k]$ is the kth channel data in the nth symbol period, $W_k[l]$ is the lth chip of the Walsh code assigned to the kth channel, $P_I[l]$ is the lth chip of the I-phase short PN sequence, $P_Q[l]$ is the ith chip of the Q-phase short PN sequence, h(t) is the impulse response of the transmit pulse shaping filter, $T_C$ is the chip duration, $T_S$ is the symbol duration, L is the number of chips per symbol, i.e., $T_S/T_C$, and K is the number of active channels.

Figure 2:
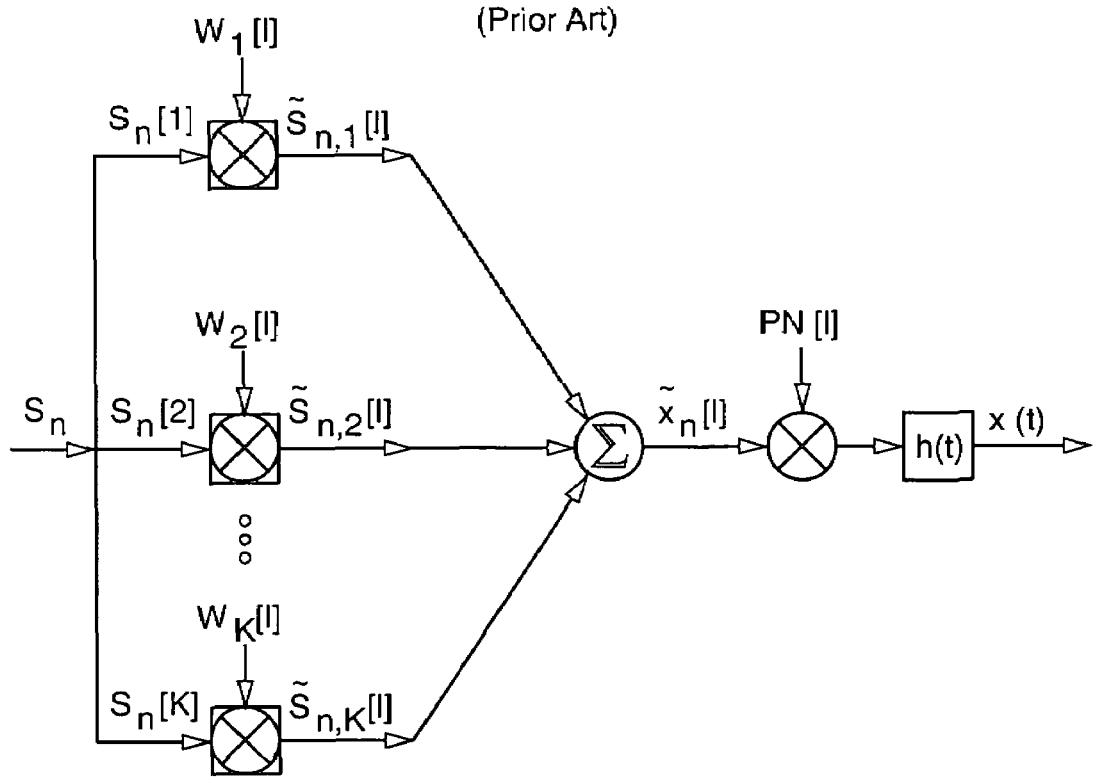
FIG. 2 illustrates a conventional forward link code division multiple access (CDMA) transmitter.

FIG. 2 illustrates a conventional CDMA transmitter constructed in accordance with Eq. (1). The K channel symbols $S_n = [S_n[1], S_n[2], \ldots, S_n[K]]^T$ are coded by K Walsh codes, $W_k[l]$, each with L=64 chips, and added together to obtain $\tilde{x}_n[l]$. The symbol rate in IS-95 A is 19.6 Ksps (symbols/sec), thus, the chip rate is 64*19.6 K=1.2288 Mcps (chips/sec). $\tilde{x}_n[l]$ is then multiplied by a complex short PN sequence PN[l]=$P_I$[l]+j$P_Q$[l] and filtered by the transmit filter h(t) to yield x(t).

Eq. (1) provides a general baseband model for a CDMA system. $S_n$[k] is BPSK for IS-95 and QPSK for CDMA2000.

The instantaneous-to-average power ratio (IAR) of the CDMA signal is defined as $$IAR = \frac{P(T)}{P_{av}}, \quad (2)$$

where P(t)=|x(t)|² and $P_{av}$=E[|x(t)|²].

The peak-to-average power ratio (PAR) is defined herein as the value γ corresponding to $$Pr(IAR>\gamma)=10^{-4}. \quad (3)$$

Of course, other small numbers such as $10^{-3}$, $10^{-5}$ etc. can be used in place of the $10^{-4}$ above, depending on the application. The objective of the disclosed crest factor reduction techniques is to reduce γ defined above.

From Eq. (1), it can be seen that two factors contribute to the high peak-to-average power ratio encountered in the forward link CDMA signal: (i) the summation over k; i.e., superposition of Walsh coded multichannel symbols; (ii) the summation over l; i.e., the effect of pulse shape filtering. To ensure that error vector magnitude (EVM) and waveform quality factor (ρ) measurements are within satisfactory limits, distortionless CFR techniques are used to the maximum extent possible. If the resulting peak-to-average power ratio is still larger than expected, CFR techniques with distortion (such as clipping and filtering) may be employed to meet the specification of the peak-to-average power ratio and other performance metrics.

In examples (simulations) discussed herein, channel parameters given in Table 1 are used, which are taken from Table 6.5.2-1 of 3GPP2 C.S0010-B v2.0 "Base Station Test Model, Nominal for Main Path".

TABLE 1

Base station test model

| Channel Type | No. of Channels | Fraction of Power | Code Channel |
|---|---|---|---|
| Forward pilot | 1 | 0.2000 | $W_0$ |
| Sync | 1 | 0.0471 | $W_{32}$ |
| Paging | 1 | 0.1882 | $W_1$ |
| Traffic | 6 | 0.09412 | Variable assignments |

Phase Selected Mapping

The CFR techniques disclosed herein employ blind phase selected mapping (SLM). Selected mapping is a simple and effective method to reduce the peak-to-average power ratio, previously developed for OFDM signals. In selected mapping, M equivalent representations of the same signal x(t), $\{x^{(m)}(t)\}_{m=1}^M$, are first obtained. Assume that the average power is invariant; i.e., E[|$x^{(m)}$(t)|²]=E[|x(t)|²], ∀m, then the peak power is $$p^{(m)} = \max_t |x^{(m)}(t)|^2, \quad (4)$$

where the maximization is over one OFDM block. Denote $$\bar{m} = \underset{1 \leq m \leq M}{\arg\min} p^{(m)}. \quad (5)$$

Selected mapping pertains to the transmission of $x^{(\bar{m})}$(t) in place of x(t).

A high peak-to-average power ratio is likely to occur when the different signal components add up coherently. It is thus reasonable to expect that if the phase of each component is independently rotated, the resulting sum may have a lower peak-to-average power ratio. In Eq. (1), replace $S_n$[k] by $$S_n^{(m)}[k]=S_n[k]e^{j\phi^{(m)}[k]}, \quad (6)$$

where the table of possible $e^{j\phi^{(m)}[k]}$ values is available at both the transmitter 11 and the receiver 12. Equivalent signal representations $x^{(m)}$(t) are obtained whose peak power $p^{(m)}$ can be smaller or larger than that of x(t). According to Eq. (5), the peak-to-average power ratio of $x^{(\bar{m})}$(t) will never exceed that of x(t). This provides for a distortionless CFR method.

Phase Table Design

The phases $\phi^{(m)}$[k] used in Eq. (6) come from a pre-determined table comprising M rows and K columns (it is assumed without loss of generality here that each $S_n$[k] is arranged as a row vector in k). Each row corresponds to a different $x^{(m)}$(t). The table may be formed by randomly selecting phases from [−π,π) (or equivalently, [0, 2π) etc, since $e^{j(\Phi+2\pi)}=e^{j\Phi}$).

In simulations, a phase table formed in a different manner was used. First, a K-element vector a=π×[−1,−1+2/K, ..., 1−2/K] is formed so the elements are taken from [−π,π) with step size 2π/K. There are K! different permutations of the elements of a. Let the mth row of the phase table be formed from the mth permutation of a. Since generally M<K!, the rows of the phase table do not repeat. The first row has all zero phases, corresponding to the original signal without any phase rotations. In practice, $e^{j\phi^{(m)}[k]}$ are pre-calculated and stored in the table.

Since CFR adds to the processing overhead, it may be desirable to carry out CFR for every block of N symbols. In that case, the above phase table can be re-used for every symbol block. Alternatively, an M×(NK) phase table may also be created in which the NK columns do not repeat.

EXAMPLE 1

The following is an example of how to construct the "random" phase table with K=4 and M=8, and apply it to the phase selected mapping algorithm. First, a 4 element row $$\text{vector } a = \left[-\pi, -\frac{\pi}{2}, 0, \frac{\pi}{2}\right]$$

is formed. There are 4×3×2=24 different permutations of the elements of a. The first row of the "random" phase table is set as zeros, corresponding to the original signal without any phase rotations. Then, randomly select 7 permutations of a to fill row 2 to row 8 in Table 2.

TABLE 2

An example of the 8 by 4 "random" phase table

| | k = 1 | k = 2 | k = 3 | k = 4 |
|---|---|---|---|---|
| m = 1 | 0 | 0 | 0 | 0 |
| m = 2 | 0 | −π/2 | −π | π/2 |
| m = 3 | π/2 | −π | 0 | −π/2 |
| m = 4 | 0 | −π/2 | π/2 | −π |
| m = 5 | −π/2 | π/2 | 0 | −π |
| m = 6 | π/2 | −π/2 | 0 | −π |
| m = 7 | −π/2 | 0 | −π | π/2 |
| m = 8 | 0 | −π | −π/2 | π/2 |

Figure 4:
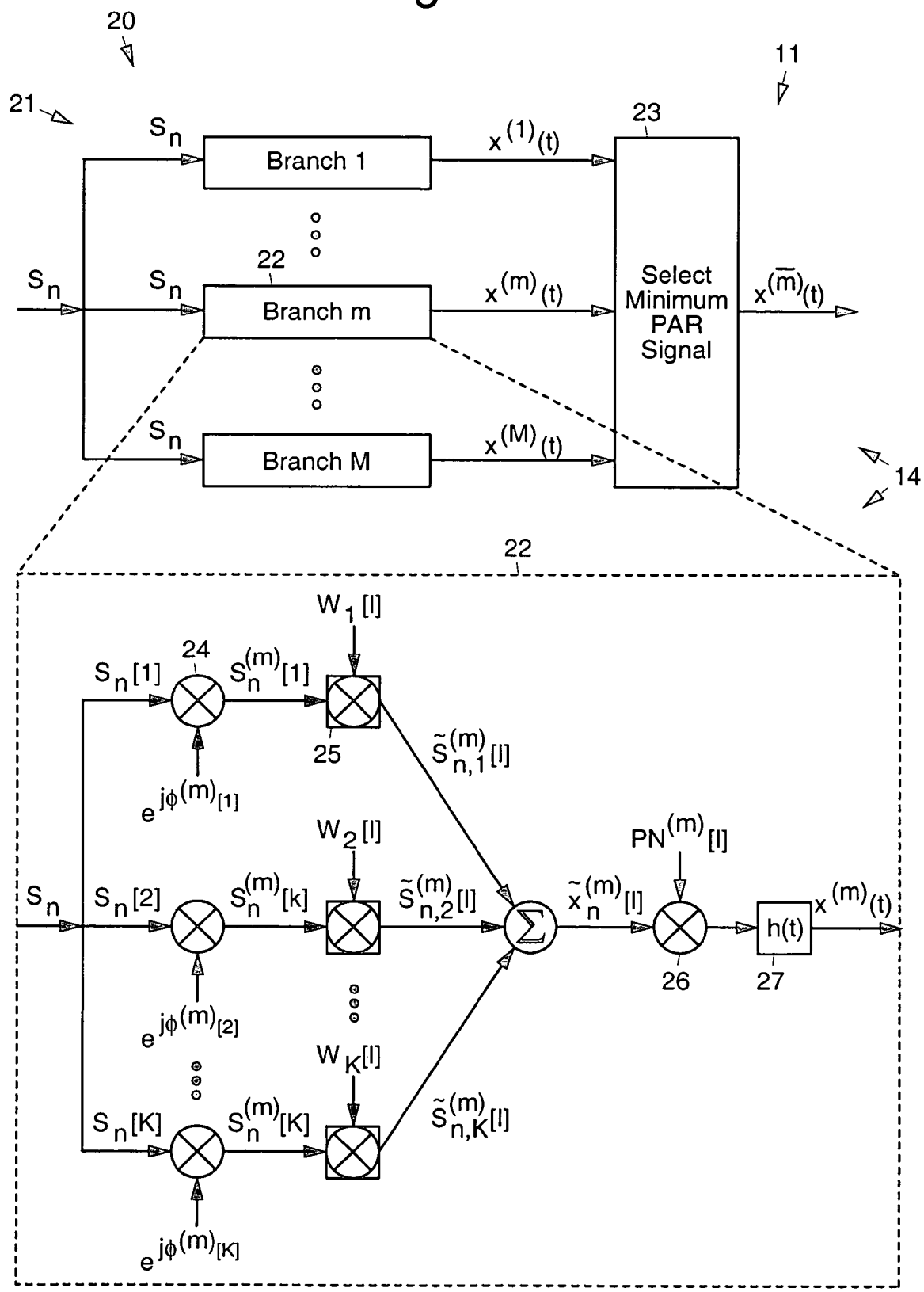
FIG. 4 illustrates a forward link code division multiple access (CDMA) transmitter using phase selected mapping.
Figure 5A:
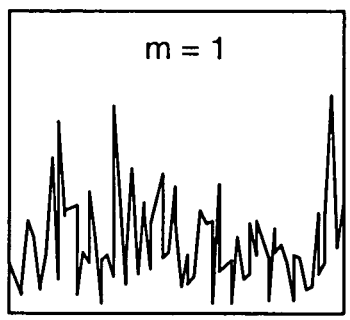
FIGS. 5a-5h illustrate exemplary magnitudes of $x^{(m)}(t)$.
Figure 5B:
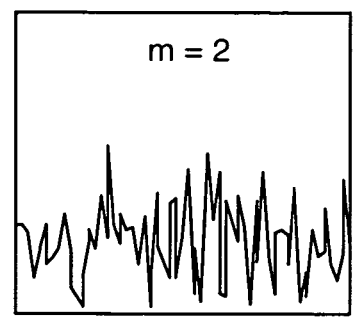
Figure 5C:
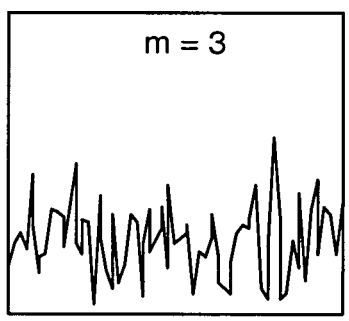
Figure 5D:
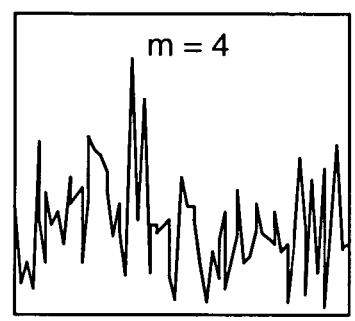
Figure 5E:
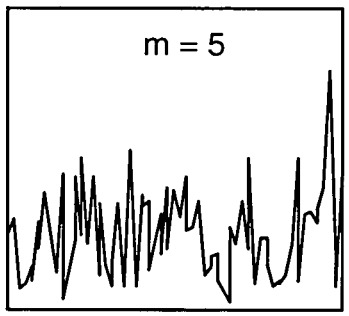
Figure 5F:
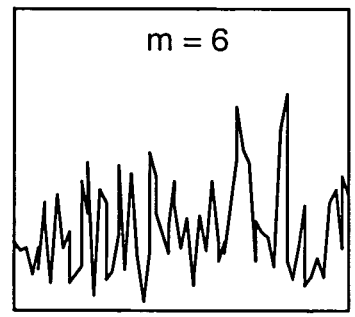
Figure 5G:
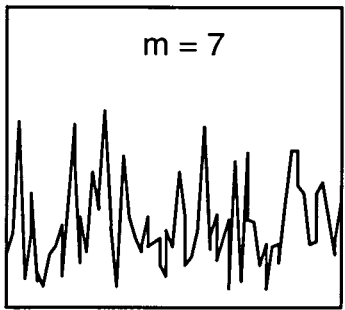
Figure 5H:
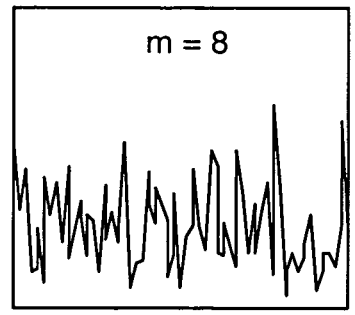

The nth multichannel symbol $S_n$ has K=4 elements, which are phase rotated by each row of Table 2 to yield M=8 equivalent signal representations as shown in FIG. 4. When the SLM frame size N=10, measure the peak in each branch of FIG. 4 over a 10 symbol period, and record the peak-to-average power ratio in Table 3.

TABLE 3

An example of the measured PARs

| | m = 1 | m = 2 | m = 3 | m = 4 | m = 5 | m = 6 | m = 7 | m = 8 |
|---|---|---|---|---|---|---|---|---|
| PAR($x^{(m)}(t)$) | 5.1517 | 4.9218 | 3.6623 | 4.9608 | 5.1829 | 4.1500 | 5.3899 | 4.2546 |

Therefore, the output signal of the third branch is transmitted and $\bar{m}=3$.

The magnitudes of $x^{(m)}(t)$ are shown in FIGS. 5a-5h.

EXAMPLE 2

In this example, the channel parameters described in Table 1 are used in the simulations (3 overhead channels plus 6 traffic channels). The continuous-time IAR was approximated by evaluating the discrete-time IAR of the 4-time oversampled (over the chip rate) signal. The CCDF of the IAR was calculated from $10^4$ CDMA symbol periods.

The receiver 12 must know the side information in order to decode. There are various ways to manage the side information issue.

One method is to transmit the side information about $\bar{m}$ in the sync or paging channel as part of the initialization process. Since the information about $\bar{m}$ is of critical importance to the receiver 12, it should be protected by channel coding. If M=16, the side information $\bar{m}$ takes up 4 bits in the uncoded case. Thus, the amount of overhead associated with the transmission of the side information can be significant.

Presented below are novel methods to blindly detect $\bar{m}$ at the receiver 12, by relying on orthogonal or near orthogonal properties of the CDMA channelization codes.

Blind Detection Using a Pilot Channel

Since the pilot channel has k=1 and $S_n[k]=S_n[1]=1, \forall n$, $W_k[l]=W_l[l]=1, \forall l$, the received pilot channel signal corresponds to $(P_I[l]+jP_Q[l])e^{j\phi^{(\bar{m})}[1]}$; the receiver 12 sees that every chip of the complex PN sequence is rotated by the same angle ($\phi^{(\bar{m})}[1]$). Using the correlation properties of the PN sequence, it is thus possible to determine the optimum phase sequence index $\bar{m}$ used in the transmission, since $$\sum_{l=1}^{L}(P_I[l]+jP_Q[l])e^{j\phi^{(\bar{m})}[1]}(P_I[l]-jP_Q[l]) = 2Le^{j\phi^{(\bar{m})}[1]} \quad (7)$$

The phase table should preferably have $e^{j\phi^{(m)}[1]} \neq e^{j\phi^{(i)}[1]}$ for $m \neq i$ to ensure the unique identification of $\bar{m}$.

Blind Detection Using PN Offsets

Figures 3A, 3B:
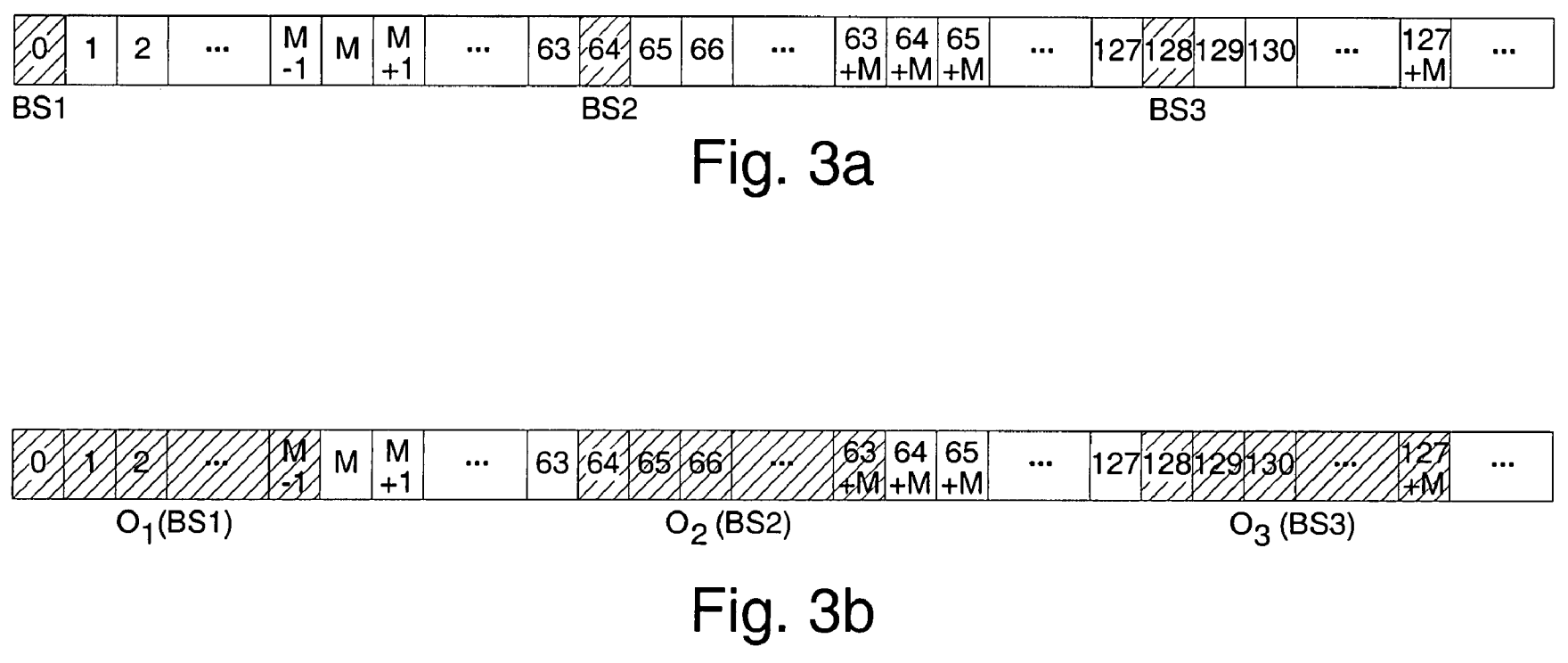

Recall that in the CDMA forward link, each base station or sector identifies itself by employing one of $2^{15}=32,768$ PN offsets. In order to avoid possible confusion in the PN offset caused by propagation delays from different base stations to a mobile receiver 12, the IS-95 standard specifies that the minimum separation between two PN offsets is 64 chips. Consequently, $32,768/64=512$ PN offsets are available. Suppose that PN offset 64i is used to identify the ith base station, i=0, ..., 511. In the BSPNM method, a "cluster" of PN offsets $\{64i+m-1\}_{m-1}^{M}$ is associated with a base station i (see FIGS. 3a and 3b). FIGS. 3a and 3b illustrate PN offset planning for CDMA and BSPNM-CDMA systems. If within the same geographical area, no more than 256 base stations are needed (the same set of PN offsets can be reused in a different region), the PN offsets may be planned such that $\{128i+m-1\}_{m-1}^{M}$ identify the ith base station. This way, as long as $M \leq 64$, the minimum separation between the PN offsets of different base stations is still at least 64 chips. With such PN offset planning, the phase sequence index m can be embedded in the choice of the short PN sequences.

In essence, Eq. (1) is modified as follows.

$$x^{(m)}(t) = \sum_{l=0}^{L-1}\sum_{k=1}^{K} A_k S_n^{(m)}[k]W_k[l](P_n^{(m)}[l]+jP_n^{(m)}[l])h(t-lT_c), \quad (8)$$

where $S_n^{(m)}[k]$ is given by Eq. (6) and the same index m is carried by the in-phase and quadrature PN sequences as well. This is referred to as the blind selected phase and PN offset mapping (BSPNM) technique. Since at the receiver 12, the PN sequence offset can be determined easily using cross-correlation techniques, blind detection of $\bar{m}$ using the same technique is straightforward. Compared to the method described above using the pilot channel, this technique may have better performance in the low SNR and high co-channel interference scenarios since we can combine the traffic as well as the overhead channel data to generate a more reliable $\bar{m}$ estimate.

In order to avoid PN sequence aliasing, the following two conditions must be satisfied according to S. C. Yang, *CDMA RF System Engineering*, Artech House, 1998:

$$d_s > 122W_{in}+2r, \quad (9)$$

where $d_s$ is the distance between two base stations that use the same PN offset, $W_{in}$ is the size of the PN offset search window in chips (i.e., system parameter SRCH_WIN_A), and r is the coverage radius of the home base station in meters. In addition, $$d_a < 244I-122W_{in}+2r, \quad (10)$$

where $d_a$ is the maximum distance between two base stations that use adjacent PN offsets, and I is the separation between two adjacent PN offsets in chips.

These conditions may be easily satisfied. For example, when $W_{in}=20$ chips, r=2,000 meters, and I=64 chips, $d_s > 6,440$ meters, and $d_a < 17,176$ meters.

Note that in the blind detection method, the separation between adjacent PN offsets is reduced from I to I−M−1 chips. Because of this, condition Eq. (10) changes to $$d_a < 244(I-M-1)-122W_{in}+2r. \quad (11)$$

For the same example with $W_{in}=20$ chips, r=2,000 meters, I=64 chips, and M=16, so that $d_s > 6,440$ meters, and $d_a < 13,272$ meters.

The modified requirement on $d_a$ can still be easily satisfied, as long as adjacent PN offsets are assigned to those cells that are physically close and similar in size.

FIG. 4 illustrates an mth branch of a baseband equivalent structure for BSPNM-CDMA transmission, and in particular, illustrates a forward link code division multiple access (CDMA) transmitter 11 using phase and PN offset selected mapping. The forward link code division multiple access (CDMA) transmitter 11 comprises phase selected mapping (SLM) apparatus 20.

As is shown in FIG. 4, the nth multichannel symbol $S_n$ passes through M SLM branches 22 to yield a set of M CDMA signals $x^{(m)}(t)$, which differ because they are rotated by a different phase sequence before Walsh spreading and pulse shape filtering. The mth SLM branch 22 is also expanded in FIG. 4, shown at the bottom of FIG. 4. It can be seen that in the mth branch 22, the multichannel symbol vector is phase rotated by the mth random phase sequence $\phi^{(m)}[k]$.

For a predetermined period of time, e.g., N symbols, the peak power of the output signal $x^{(m)}(t)$ from each branch 22 is measured, and the one with the lowest peak is transmitted. Using the present algorithm, the selected mapping is performed on a frame of N symbols, which means all the N symbols in each frame have the same $\bar{m}$.

The phase selected mapping (SLM) apparatus 20 comprises a phase and PN offset selected mapping block 21 comprising multiple branches 22 for generating a plurality of equivalent representations of an original CDMA signal and selection apparatus 23 for selecting an equivalent representation signal having the lowest peak-to-average power ratio for transmission for a predetermined period of time. A companion CDMA mobile receiver 12 comprises a phase and PN offset demapping block for detecting the phase and PN offset in the transmitter 11 for the predetermined period of time and for recovering current user data in the original CDMA signal.

Each of the SLM branches 22 comprise a plurality of phase mapping units 24 for rotating phases of concurrent multiuser CDMA symbols comprising the original CDMA signal. A plurality of Walsh spreading units 25 are used to spread the concurrent multiuser symbols into a phase mapping sequence of chips. A PN offset mapping unit 26 is used to multiply each phase mapping sequence by a PN sequence with an offset that has substantially the same index as the phase mapping sequence. A pulse shape filter 27 is used to shape the spectrum of the equivalent representation signal for transmission. The selection apparatus 23 comprises a lowest peak signal selector for selecting the equivalent representation signal for transmission for a predetermined period of time that has the lowest peak.

Example 3

The same set up as in example 2 is used in example 3. FIG. 7 shows the CCDF of the IAR for the CDMA signal, before and after CFR. The performance of the technique proposed by J. S. Lee et al. is also shown for comparison. With M=50 mappings, the BSPNM technique can realize the goal of reducing the peak-to-average power ratio to 5.4 dB (at the 0.01% CCDF level). The larger the M (more mapping selections), the better the peak-to-average power ratio reducing capability of selected mapping, but there appears to be a diminishing return in increasing M beyond about M=32. With M=32, the peak-to-average power ratio was reduced by more than 3 dB at the CCDF level of $10^{-4}$.

FIG. 6 illustrates CFR performance of BSPNM for CDMA. FIG. 7 illustrates CFR performance of BSPNM for CDMA2000, which is similar to the results shown in FIG. 6. The same conclusions can be drawn.

Blind Walsh Code Selected Mapping

It is generally well known that the peak-to-average power ratio of a CDMA signal is a function of the Walsh code(s) used. See for example, R. N. Braithwaite, "Exploiting data and code interactions to reduce the power variance for CDMA sequences," *IEEE Journal on Selected Areas in Communications*, vol. 19, no. 5, pp. 1061-1069, June 2001, Y. J. Kou, W. S. Lu, and A. Antoniou, "Peak-to-average power-ratio reduction via channel hopping for downlink CDMA systems," *Proceedings of the 2003 International Symposium on Circuits and Systems*, vol. 2, pp. 236-239, May 2003, and V. K. N. Lau, "Average of peak-to-average ratio (PAR) of 1S95 and CDMA2000 systems—single carrier," *IEEE Commun. Lett.*, vol. 5, no. 4, pp. 160-162, April 2001.

Different from what is disclosed by V. K. N. Lau, "On the analysis of peak-to-average ratio (PAR) for IS95 and CDMA 2000," *IEEE Trans. Veh. Technol.*, vol. 49, no. 6, pp. 2174-2188, November 2000, and A. G. Shanbhag, and E. G. Tiedemann, "Peak-to-average reduction via optimal Walsh code allocation in third generation CDMA systems," *IEEE 6th International Symposium on Spread Spectrum Techniques and Applications*, vol. 2, pp. 560-564, September 2000, which aimed at finding one good set of Walsh codes, the selected mapping concept disclosed herein is extended to Walsh code selection.

Suppose that the system is not at full capacity and each traffic channel can use one of two alternative Walsh codes. Table 4 shows an example Walsh code assignment scheme; the same table is available at the transmitter 11 and at the receiver 12. There are other ways to assign the Walsh codes; for example, $\{W_8, W_9\}$ may be assigned to traffic channel 1, $\{W_{10}, W_{11},\}$ may be assigned to traffic channel #2, and so forth.

TABLE 4

Walsh code allocation scheme for blind Walsh code selected mapping

| Traffic Channel | Walsh Code Choices |
| --- | --- |
| 1 | $W_8$ or $W_{33}$ |
| 2 | $W_9$ or $W_{34}$ |
| 3 | $W_{10}$ or $W_{35}$ |
| 4 | $W_{11}$ or $W_{36}$ |
| 5 | $W_{12}$ or $W_{37}$ |
| 6 | $W_{13}$ or $W_{37}$ |

For 6 traffic channels, there are $M=2^6=64$ different combinations of the Walsh codes each leading to a different peak-to-average power ratio for the resulting forward channel signal. $x^{(\bar{m})}(t)$ is selected that has the lowest peak-to-average power ratio among $\{x^{(m)}(t)\}_{m=1}^M$ to be transmitted.

Because of the orthogonality property of the Walsh codes, a mobile receiver is able to figure out which one of the two Walsh codes was used for its traffic channel, by cross-correlating either Walsh code with the received data.

In selected mapping, all Mappings are tried and the $x^{(\bar{m})}(t)$ representation that has the lowest peak-to-average power ratio is transmitted. In practice however, the objective is often to meet a given peak-to-average power ratio threshold (e.g., 5.4 dB); minimizing the peak-to-average power ratio may not be necessary. Indeed, if adaptive biasing of the power amplifier is not pursued but power control is desirable, reducing the peak-to-average power ratio below the given threshold (based on which the power amplifier is biased), does not help to boost the power efficiency. With this in mind, a PAR threshold y may be set, one mapping $x^{(m)}(t)$ may be generated at a time, and the process is stopped once the peak-to-average power ratio threshold is met. Using this approach, the actual number of mappings is M; thus the computational load is reduced as compared to a "full-blown" selected mapping.

FIG. 8 illustrates an exemplary forward link CDMA transmitter 11 using Walsh code selected mapping. As can be seen in FIG. 8, for K channels with 2 Walsh codes per channel, there are $M=2^K$ different combinations of the Walsh codes, resulting in $M=2^K$ forward channel signals. The $x^{(m)}(t)$ is selected that has the lowest PAR to transmit. Note that K can be much less than the total number of active users so that some channels are allowed Walsh code diversity, whereas other channels use only one Walsh code. Choice of the number of Walsh code diversity channels is a trade-off between capacity and the desired PAR reducing capability.

The exemplary forward link CDMA transmitter 11 using Walsh code selected mapping comprises Walsh code selected mapping (SLM) apparatus 20. The Walsh code selected mapping (SLM) apparatus 20 comprises a Walsh code selected mapping block 31 for generating a plurality of equivalent representations of an original CDMA signal and selection apparatus 32 for selecting the equivalent representation signal having the lowest peak-to-average power ratio for a predetermined period of time. A companion CDMA mobile receiver 12 comprises a Walsh code selected demapping block for detecting the Walsh code in the transmitter 11 for the predetermined period of time and for recovering current user data in the original CDMA signal.

The Walsh code selected mapping block 31 comprises a Walsh code spreading and combination block 33 for taking K user data symbols and for outputting a plurality of different combinations of Walsh codes. A plurality of PN modulation and filtering units 35, 36 are used to modulate each Walsh code output from the Walsh code spreading and combination block 33 with a PN sequence. A lowest peak signal selector 32 is used to select a modulated signal that has the lowest peaks for transmission for a predetermined period of time.

To reduce the computational complexity, one can move the lowest peak signal selector 32 to a position before the PN modulation units 35 so that only one branch of PN modulation and filtering units 35, 36 is needed. This may result in a sacrifice in PAR reducing capability since the lowest PAR branch before filtering may not correspond to the lowest PAR branch after filtering.

Thus, blind selected mapping apparatus and methods have been disclosed that provide for crest factor reduction of forward link CDMA signals. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Apparatus for reducing the peak-to-average power ratio of a forward link code division multiple access (CDMA) signal in a mobile communication system, comprising:
   a selected mapping block in a forward link CDMA transmitter for generating a plurality of equivalent representations of an original CDMA signal using a selected mapping index and for selecting an equivalent representation signal having the lowest peak-to-average power ratio for transmission for a predetermined period of time; and
   a demapping block in a CDMA mobile receiver for detecting the selected mapping index used in the transmitter for the predetermined period of time and for recovering current user data in the original CDMA signal.

2. The apparatus recited in claim 1, wherein the selected mapping block comprises a phase and PN offset selected mapping block in which the selected mapping index comprises a phase and PN offset, and wherein the demapping block comprises a phase and PN offset demapping block in a CDMA mobile receiver for detecting the phase and PN offset used in the transmitter.

3. The apparatus recited in claim 1, wherein the selected mapping block comprises a Walsh code selected mapping block in which the selected mapping index comprises a Walsh code, and wherein the demapping block comprises a Walsh code demapping block in a CDMA mobile receiver for detecting the Walsh code used in the transmitter.

4. The apparatus recited in claim 1, wherein the selected mapping block comprises a phase selected mapping block in which the selected mapping index comprises a phase sequence, and wherein the demapping block detects the phase sequence used in the transmitter using a pilot channel.

5. The apparatus recited in claim 1, wherein the phase selected mapping block uses a predetermined phase table that has distinct values for a first element of each phase sequence.

6. The apparatus recited in claim 1, wherein a phase demapping block detects the selected mapping index used in the transmitter based on a pilot channel component in an output of a PN correlator according to the equation:

$$\sum_{l=1}^{L}(P_I[l]+jP_Q[l])e^{j\phi^{(m)}[1]}(P_I[l]-jP_Q[l])=2Le^{j\phi^{(m)}[1]},$$

where $P_I[l]+jP_Q[l]$ is the PN sequence and $\phi^{(m)}[1]$ is the first element of the $\overline{m}$ th phase sequence.

7. Apparatus for reducing the peak-to-average power ratio of a forward link code division multiple access (CDMA) signal in a mobile communication system, comprising:
   a phase and PN offset selected mapping block in a forward link CDMA transmitter for generating a plurality of equivalent representations of an original CDMA signal and for selecting an equivalent representation signal having die lowest peak-to-average power ratio for transmission for a predetermined period of time; and
   a phase and PN offset demapping block in a CDMA mobile receiver for detecting the phase and PN offset used in the transmitter for the predetermined period of time and for recovering current user data in the original CDMA signal.

8. The apparatus recited in claim 7, wherein the phase and PN offset selected mapping block comprises:
   a plurality of phase mapping units for rotating phases of concurrent multiuser CDMA symbols comprising die original CDMA signal;
   a plurality of Walsh spreading units for spreading the concurrent multiuser symbols into a phase mapping sequence of chips;
   a plurality of PN offset mapping units for multiplying each phase mapping sequence by a PN sequence with an offset that has substantially the same index as the phase mapping sequence;
   a plurality of pulse shape filters for shaping the spectrum of the equivalent representation signal for transmission; and a lowest peak signal selector for selecting the equivalent representation signal for transmission for a predetermined period of time that has the lowest peaks.

9. The apparatus recited in claim 8, wherein each phase mapping unit rotates K user symbols by multiplying diem with a sequence of complex exponentials whose phases are selected from a predetermined phase table.

10. The apparatus recited in claim 8, wherein an mth phase mapping is performed according to the equation: $S_n^{(m)}[k]=S_n[k]e^{j\phi^{(m)}[k]}$, where $S_n[k]$ is the kth user symbol during the nth symbol period, $\phi^{(m)}[k]$ is the kth element in the mth phase sequence and $S_n^{(m)}[k]$ is the mth phase mapping output.

11. The apparatus recited in claim 10, wherein the predetermined phase table, $\{\phi^{(m)}[k]\}_{\leq k \leq K}^{\leq m \leq M}$, comprises M length K phase sequences, where M is the number of the equivalent CDMA signal representations.

12. The apparatus recited in claim 11, wherein a phase table is formed by:
setting a given row to be zeros, corresponding to the original signal without any phase rotations;
forming a K-element vector $a=\pi \times [-1,-1+2/K,\ldots,1-2/K]$ so the elements are taken from $[-\pi,\pi)$ with step size $2\pi/K$; and
forming each of the remaining rows of the phase table from a nonrepetitive permutation of a.

13. The apparatus recited in claim 8, wherein the lowest peak selector detects peak power of each of a plurality of input signals for a predetermined period of time, and then selects the signal that has the lowest peak power to transmit.

14. The apparatus recited in claim 9, wherein the phase and PN offset mapping block is carried out for every block of N symbols, and wherein the phase table is re-used for every symbol block.

15. The apparatus recited in claim 7, wherein a phase table comprises an M×(NK) phase table in which the NK columns do not repeat 16. The apparatus recited in claim 7, wherein the phase and PN offset demapping block in the mobile receiver comprises decoding circuitry and correlation circuitry that performs correlation processing of the equivalent representation signal to recover current user data in the original CDMA signal.

17. The apparatus recited in claim 7, wherein the phase and PN offset selected mapping block comprises a lookup table containing multiple independent phase sequences that are used to generate the plurality of equivalent representations of the original signal, and wherein the phase and PN offset demapping block in the mobile receiver comprises decoding circuitry that includes a copy of the lookup table and correlation circuitry performs correlation processing of the equivalent representation signal to recover the current user data in the original CDMA signal.

18. Apparatus for reducing a peak-to-average power ratio of a code division multiple access (CDMA) signal in a mobile communication system comprising:
a Walsh code selected mapping block in a CDMA forward link transmitter for generating a plurality of equivalent representations of an original CDMA signal and for selecting the equivalent representation signal having the lowest peak-to-average power ratio for a predetermined period of time; and
a Walsh code selected demapping block in a CDMA mobile receiver for detecting the Walsh code used in the transmitter for the predetermined period of time and for recovering current user data in the original CDMA signal.

19. The apparatus recited in claim 18, wherein the Walsh code selected mapping block comprises:
a Walsh code spreading and combination block for receiving K user data symbols and for outputting a plurality of different combinations of Walsh codes;
a plurality of PN modulation and filtering units for modulating each Walsh code output from the Walsh code spreading and combination block with a PN sequence; and
a lowest peak signal selector for selecting a modulated signal that has the lowest peaks for transmission for a predetermined period of time.

20. The apparatus recited in claim 19, wherein the Walsh code spreading and combination block spreads each of the K user symbols using two assigned Walsh codes to obtain two chip-level spread sequences; $2^K$ different combinations are provided with each combination comprising K chip-level sequences, one from each user; and in each combination, the K chip-level sequences are summed together to form an output signal.

21. The apparatus recited in claim 19, wherein the Walsh code spreading and combination block combines a subset of all $2^K$ different combinations, and wherein the Walsh code combinations that have statistically lowest peak-to-average power ratios are used to form a subset.

22. The apparatus recited in claim 19, wherein each PN modulation and filtering unit modulates each Walsh code with the PN sequence and shapes the spectrum of the modulated signal using a pulse shape filter.

23. The apparatus recited in claim 19, wherein the lowest peak signal selector detects the peak power of each of the plurality of modulated signals for a predetermined period of time and selects the signal having the lowest peak power for transmission.

24. The apparatus recited in claim 19, wherein the Walsh code selected mapping block processes each block of N symbols, and the lowest peak signal selector detects the peak power of each input signal for a period of N symbols and transmits the signal with the lowest peak.

25. The apparatus recited in claim 18. wherein the Walsh code selected demapping block comprises:
two correlators for correlating received signals with two Walsh codes that are assigned to a current user; and
a peak detector for comparing the power of symbols output from the correlators and for selecting the larger one as a de-spread user symbol.

26. The apparatus recited in claim 25, wherein the two correlators are synchronized, each chip in a symbol is multiplied by its associated Walsh code, and all chips are summed into one symbol.

27. The apparatus recited in claim 25, wherein the peak detector compares the power of the two symbols output from the correlators and selects the one with the higher power for further user symbol detection.

28. The apparatus recited in claim 27, wherein the peak detector compares average power of N consecutive symbols and selects the one with the highest average power for further user symbol detection when the Walsh code selected mapping block in the transmitter carries out selected mapping for each block of N symbols.

* * * * *